US012621517B2

(12) United States Patent
Arling et al.

(10) Patent No.: US 12,621,517 B2
(45) Date of Patent: *May 5, 2026

(54) SYSTEM AND METHOD FOR RECONFIGURATION OF AN ENTERTAINMENT SYSTEM CONTROLLING DEVICE

(71) Applicant: Universal Electronics Inc., Scottsdale, AZ (US)

(72) Inventors: Paul D. Arling, Irvine, CA (US); Patrick H. Hayes, Mission Viejo, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/213,949

(22) Filed: Jun. 26, 2023

(65) Prior Publication Data

US 2023/0336807 A1      Oct. 19, 2023

Related U.S. Application Data

(63) Continuation of application No. 17/977,685, filed on Oct. 31, 2022, now Pat. No. 11,825,147, which is a
(Continued)

(51) Int. Cl.
*H04N 21/422*      (2011.01)
*H04L 12/28*      (2006.01)
(Continued)

(52) U.S. Cl.
CPC ... *H04N 21/42225* (2013.01); *H04L 12/2809* (2013.01); *H04L 12/281* (2013.01);
(Continued)

(58) Field of Classification Search
CPC ............ H04N 21/42225; H04N 5/765; H04N 21/41265; H04N 21/42204;
(Continued)

(56) References Cited

U.S. PATENT DOCUMENTS

| | | | |
|---|---|---|---|
| 2,275,800 A | 3/1942 | Olson | |
| 4,959,810 A | 9/1990 | Darbee et al. | |

(Continued)

FOREIGN PATENT DOCUMENTS

| | | |
|---|---|---|
| EP | 2091246 A2 | 8/2009 |
| GB | 2275800 A | 9/1994 |

(Continued)

OTHER PUBLICATIONS

Brazilian Patent Office, office action issued on Brazilian patent application No. BR1120120069896, 2 pages.
(Continued)

*Primary Examiner* — James J Yang
*Assistant Examiner* — Cal J Eustaquio
(74) *Attorney, Agent, or Firm* — Greenberg Traurig, LLP

(57) ABSTRACT

An entertainment device initiates a configuration process of a controlling device in response to a change in an audio visual entertainment system configuration in which at least one of a plurality devices is connected to the entertainment device as an audio and/or visual source and at least one of the plurality of devices is connected to the entertainment device as an audio and/or visual output destination for the entertainment device.

18 Claims, 9 Drawing Sheets

Related U.S. Application Data continuation of application No. 17/330,923, filed on May 26, 2021, now Pat. No. 11,533,530, which is a continuation of application No. 16/584,088, filed on Sep. 26, 2019, now Pat. No. 11,076,196, which is a continuation of application No. 16/381,278, filed on Apr. 11, 2019, now Pat. No. 10,455,272, which is a continuation of application No. 16/045,309, filed on Jul. 25, 2018, now Pat. No. 10,306,291, which is a continuation of application No. 15/786,852, filed on Oct. 18, 2017, now Pat. No. 10,097,877, which is a continuation of application No. 14/167,619, filed on Jan. 29, 2014, now Pat. No. 9,826,266, which is a continuation-in-part of application No. 13/785,015, filed on Mar. 5, 2013, now Pat. No. 8,830,074, which is a continuation of application No. 12/621,277, filed on Nov. 18, 2009, now Pat. No. 8,456,314, which is a continuation-in-part of application No. 12/569,121, filed on Sep. 29, 2009, now Pat. No. 8,243,207.

(51) Int. Cl.

| | |
|---|---|
| *H04N 5/765* | (2006.01) |
| *H04N 21/41* | (2011.01) |
| *H04N 21/436* | (2011.01) |
| *H04N 21/4363* | (2011.01) |
| *H04N 21/442* | (2011.01) |
| *H04N 21/47* | (2011.01) |
| *H04N 21/485* | (2011.01) |
| *H04N 21/488* | (2011.01) |

(52) U.S. Cl.
CPC ......... *H04N 5/765* (2013.01); *H04N 21/4126* (2013.01); *H04N 21/41265* (2020.08); *H04N 21/42204* (2013.01); *H04N 21/4221* (2013.01); *H04N 21/42228* (2013.01); *H04N 21/43615* (2013.01); *H04N 21/43632* (2013.01); *H04N 21/44227* (2013.01); *H04N 21/47* (2013.01); *H04N 21/485* (2013.01); *H04N 21/4852* (2013.01); *H04N 21/4882* (2013.01); *H04L 12/282* (2013.01)

(58) Field of Classification Search
CPC ......... H04N 21/4221; H04N 21/42228; H04N 21/43615; H04N 21/43632; H04N 21/44227; H04N 21/47; H04N 21/485; H04N 21/4852; H04N 21/4882; H04L 12/2809; H04L 12/281; H04L 12/282
See application file for complete search history.

(56) References Cited

U.S. PATENT DOCUMENTS

| | | | |
|---|---|---|---|
| 5,481,256 A | 1/1996 | Darbee et al. |
| 5,614,906 A | 3/1997 | Hayes et al. |
| 5,959,751 A | 9/1999 | Darbee et al. |
| 6,014,092 A | 1/2000 | Darbee et al. |
| 6,169,879 B1 | 1/2001 | Perlman |
| 6,225,938 B1 | 5/2001 | Hayes et al. |
| 6,784,804 B1 | 8/2004 | Hayes |
| 6,784,805 B2 | 8/2004 | Harris et al. |
| 6,910,085 B2 | 6/2005 | Takaku et al. |
| 6,918,136 B2 | 7/2005 | Shepherd |
| 6,930,730 B2 | 8/2005 | Maxon et al. |
| 7,119,710 B2 | 10/2006 | Hayes et al. |
| 7,139,981 B2 | 11/2006 | Mayer, III et al. |
| 7,155,305 B2 | 12/2006 | Hayes et al. |
| 7,234,115 B1 | 6/2007 | Sprauve et al. |
| 7,339,513 B1 | 3/2008 | Provis et al. |
| 7,586,398 B2 | 9/2009 | Huang et al. |
| 7,671,758 B1 | 3/2010 | Seidel |
| 7,693,935 B2 | 4/2010 | Weber et al. |
| 7,714,940 B2 | 5/2010 | Lefevre et al. |
| 7,742,606 B2 | 6/2010 | Kreifeldt et al. |
| 7,784,805 B2 | 8/2010 | Morgan |
| 7,818,482 B2 | 10/2010 | Shimozawa et al. |
| 7,877,705 B2 | 1/2011 | Chambers et al. |
| 8,063,923 B2 | 11/2011 | Lilleness et al. |
| 8,170,883 B2 | 5/2012 | Oh et al. |
| 8,385,304 B2 | 2/2013 | Negron |
| 8,786,411 B1 | 7/2014 | Seidel |
| 9,241,114 B1 | 1/2016 | McQuaide |
| 10,306,291 B2 | 5/2019 | Arling et al. |
| 2001/0025330 A1 | 9/2001 | Ol et al. |
| 2002/0105534 A1 | 8/2002 | Balassanian |
| 2002/0171624 A1 | 11/2002 | Stecyk et al. |
| 2002/0194621 A1 | 12/2002 | Tran et al. |
| 2003/0141987 A1 | 7/2003 | Hayes |
| 2003/0234737 A1 | 12/2003 | Nelson et al. |
| 2004/0004630 A1 | 1/2004 | Kalva et al. |
| 2004/0070491 A1 | 4/2004 | Huang et al. |
| 2004/0117843 A1 | 6/2004 | Karaoguz et al. |
| 2005/0034160 A1 | 2/2005 | Kim et al. |
| 2005/0285750 A1 | 12/2005 | Hayes |
| 2006/0048194 A1 | 3/2006 | Poslinski |
| 2006/0050142 A1 | 3/2006 | Scott |
| 2006/0059275 A1 | 3/2006 | Lefevre et al. |
| 2006/0101498 A1 | 5/2006 | Arling et al. |
| 2007/0052547 A1 | 3/2007 | Haughawout |
| 2007/0124772 A1 | 5/2007 | Bennett |
| 2007/0185597 A1 | 8/2007 | Bejean et al. |
| 2008/0065232 A1* | 3/2008 | Igoe ......................... G10H 1/08 |
| | | 700/1 |
| 2008/0066123 A1 | 3/2008 | Igoe et al. |
| 2008/0088495 A1 | 4/2008 | Kawakita |
| 2008/0186078 A1 | 8/2008 | Shintani et al. |
| 2008/0278635 A1 | 11/2008 | Hardacker |
| 2009/0254966 A1 | 10/2009 | Josephs et al. |
| 2010/0013998 A1 | 1/2010 | Mortensen |
| 2010/0079682 A1 | 4/2010 | Martch |
| 2010/0180307 A1 | 7/2010 | Hayes et al. |
| 2010/0201891 A1 | 8/2010 | Laroia et al. |
| 2010/0207778 A1 | 8/2010 | Haughawout et al. |
| 2010/0287258 A1 | 11/2010 | Takeuchi |
| 2010/0309375 A1 | 12/2010 | Alexander |
| 2010/0321178 A1 | 12/2010 | Deeds |
| 2011/0030016 A1 | 2/2011 | Pino |
| 2011/0074591 A1 | 3/2011 | Arling et al. |
| 2011/0106984 A1 | 5/2011 | Tanaka et al. |
| 2011/0126135 A1 | 5/2011 | Chambers et al. |
| 2011/0157478 A1 | 6/2011 | McRae et al. |
| 2012/0212680 A1 | 8/2012 | Kohanek |
| 2013/0163469 A1 | 6/2013 | Negron |
| 2013/0344962 A1 | 12/2013 | Reams |
| 2015/0071603 A1 | 3/2015 | Bae |
| 2015/0091692 A1 | 4/2015 | Lambourne |
| 2016/0353153 A1 | 12/2016 | Seidel |
| 2018/0343497 A1 | 11/2018 | Brown |

FOREIGN PATENT DOCUMENTS

| | | |
|---|---|---|
| JP | 2009171232 A | 7/2009 |
| WO | 2009090906 A1 | 7/2009 |

OTHER PUBLICATIONS

ISA/US, International Search Report and Written Opinion issued on PCT Application No. US15/12993, mailed on Apr. 17, 2015, 8 pgs.
European Patent Office, examination report issued on European patent application No. 15742933.3, dated Dec. 6, 2017, 7 pgs.
U.S. Patent and Trademark Office, Non-Final Office Action issued in U.S. Appl. No. 15/063,779, dated Aug. 10, 2017, 12 pgs.
European Patent Office, extended European search report issued on European patent application No. 15742933.3, dated Dec. 13, 2016, 8 pgs.
European Patent Office, Examination report issued on European patent application No. 10821115.2, dated Nov. 19, 2014, 7 pgs.

(56)        References Cited

OTHER PUBLICATIONS

European Patent Office, Examination report issued on European patent application No. 10821128.5, dated Nov. 19, 2014, 6 pgs.
European Patent Office, Supplementary European Search Report of EP patent application No. 10821128.5, date of completion of search Aug. 27, 2012, 6 pgs.
European Patent Office, Supplementary European Search Report of EP patent application No. 10821115.2, date of completion of search Aug. 20, 2012, 3 pgs.
WIPO, International Preliminary Report on Patentability of PCT Appln. No. US2010/050614, Apr. 3, 2012, 6 pgs.

* cited by examiner

316 Key matrix

302 User feedback device

318 Input/Output

Microcoprocessor

300

310 Transmitter or transceiver circuit

306 NV memory

304 ROM memory

305 RAM memory

Crystal

314

Clock and timer logic

312

100

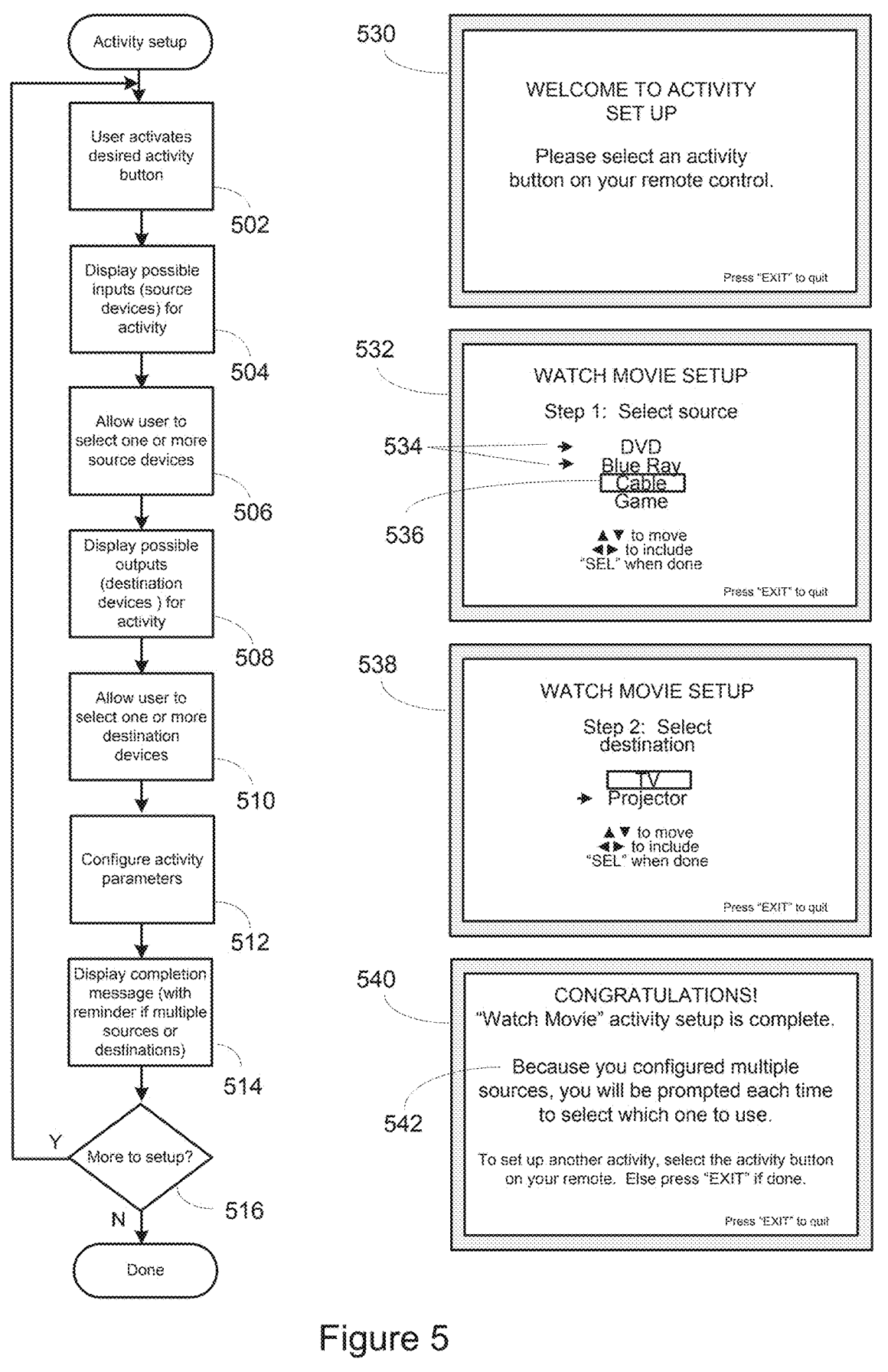

Activity setup

User activates desired activity button — 502

Display possible inputs (source devices) for activity — 504

Allow user to select one or more source devices — 506

Display possible outputs (destination devices ) for activity — 508

Allow user to select one or more destination devices — 510

Configure activity parameters — 512

Display completion message (with reminder if multiple sources or destinations) — 514

More to setup? — 516
Y
N

Done

530

WELCOME TO ACTIVITY
SET UP

Please select an activity
button on your remote control.

Press "EXIT" to quit

532

WATCH MOVIE SETUP

Step 1:  Select source

534 →  DVD
Blue Ray
Cable
Game

536

▲ ▼ to move
◄ ► to include
"SEL" when done

Press "EXIT" to quit

538

WATCH MOVIE SETUP

Step 2:  Select destination

TV
→ Projector

▲ ▼ to move
◄ ► to include
"SEL" when done

Press "EXIT" to quit

540

CONGRATULATIONS!
"Watch Movie" activity setup is complete.

542

Because you configured multiple
sources, you will be prompted each time
to select which one to use.

To set up another activity, select the activity button
on your remote.  Else press "EXIT" if done.

Press "EXIT" to quit

Figure 5

DEVICE PROBLEM?

IT APPEARS THAT YOUR DVD
PLAYER IS NOT RESPONDING AS
EXPECTED.

SUGGESTIONS:

- Is your remote in "DVD" mode?
- Is there an object between you and the player?
- Does your remote need to be set up?

EXIT to quit

800

SYSTEM AND METHOD FOR RECONFIGURATION OF AN ENTERTAINMENT SYSTEM CONTROLLING DEVICE

RELATED APPLICATION DATA

This application claims the benefit of and is a continuation of U.S. application Ser. No. 17/977,685, filed on Oct. 31, 2022, which application claims the benefit of and is a continuation of U.S. application Ser. No. 17/330,923, filed on May 26, 2021, which application claims the benefit of and is a continuation of U.S. application Ser. No. 16/584, 088, filed on Sep. 26, 2019, which application claims the benefit of and is a continuation of U.S. application Ser. No. 16/381,278, filed on Apr. 11, 2019, which application claims the benefit of and is a continuation of U.S. application Ser. No. 16/045,309, filed on Jul. 25, 2018, which application claims the benefit of and is a continuation of U.S. application Ser. No. 15/786,852, filed on Oct. 18, 2017, which application claims the benefit of and is a continuation of U.S. application Ser. No. 14/167,619, filed on Jan. 29, 2014, which application claims the benefit of and is a continuation-in-part of U.S. application Ser. No. 13/785,015, filed on Mar. 5, 2013, which application claims the benefit of and is a continuation of U.S. application Ser. No. 12/621,277, filed on Nov. 18, 2009, which application claims the benefit of and is a continuation-in-part of U.S. application Ser. No. 12/569,121 filed Sep. 29, 2009, the disclosures of which are incorporated herein by reference in the entirety.

BACKGROUND

Home entertainment systems in which multiple media sources and multiple media rendering devices are coupled through a central routing device such as an AV receiver are well known in the art, as are universal controlling devices adaptable to issue commands to a multiplicity of appliances of different manufacture and/or type and which are frequently associated with such home entertainment systems. As these home entertainment systems become increasingly complex due to the proliferation of media formats, appliance types, etc., the user actions required to configure a home entertainment system to match a desired activity such as watching TV or listening to music have become increasing onerous and error prone. Various methods have been proposed for automating all or part of these configuration operations, for example through use of controlling device based macro sequences such as described in U.S. Pat. No. 5,959,751 or state-based control such as described in U.S. Pat. No. 7,784,805. However, such methods may themselves be subject to error when equipment configurations or connections are not as expected, leading only to further user frustration.

SUMMARY

This disclosure relates generally to improved methods for configuring a multi-input and/or multi-output home entertainment system to match a user's desired activities and/or to a method for configuring a controlling device. In such systems, the outputs and inputs of the various components are generally routed to and switched through one central device such as an AV receiver. The inventive methods described herein comprise a cooperative effort between the AV receiver and an associated universal controlling device such as a remote control in which activation of an activity key or button on the controlling device results in transmission of a signal to the AV receiver to initiate certain previously defined configuration actions, which actions may be conditioned upon the AV receiver's determination of the current status of connected devices. In addition, certain controlling device command transmissions to other appliances in the home entertainment system may also be initiated as a result of said activity key activation, either unilaterally by the controlling device or at the request of the AV receiver. Since the AV receiver has access to appliance status information not available to the controlling device (by virtue of the AV receiver's physical connection to those appliances), and the controlling device in turn has access to appliance command functions not available to the AV receiver, the cooperative execution of an activity configuration request in this manner may result in more reliable and user-friendly system operation. In addition, since prior art initial user set up of AV receivers is generally GUI based and includes assignment of user-friendly names to source and destination appliances (for example, "DVD" in place of "Video input 3"), a user's initial specification of desired activity configurations may be facilitated by the use of these features when configuring activities.

A better understanding of the objects, advantages, features, properties and relationships of the subject disclosure will be obtained from the following detailed description and accompanying drawings which set forth illustrative embodiments and which are indicative of the various ways in which the principles of the subject disclosure may be employed.

BRIEF DESCRIPTION OF THE DRAWINGS

For a better understanding of the various aspects of the subject disclosure, reference may be had to preferred embodiments shown in the attached drawings in which:

FIG. 5 illustrates an exemplary activity configuration setup process in accordance with the methods of this subject disclosure;

DETAILED DESCRIPTION

Figure 1:
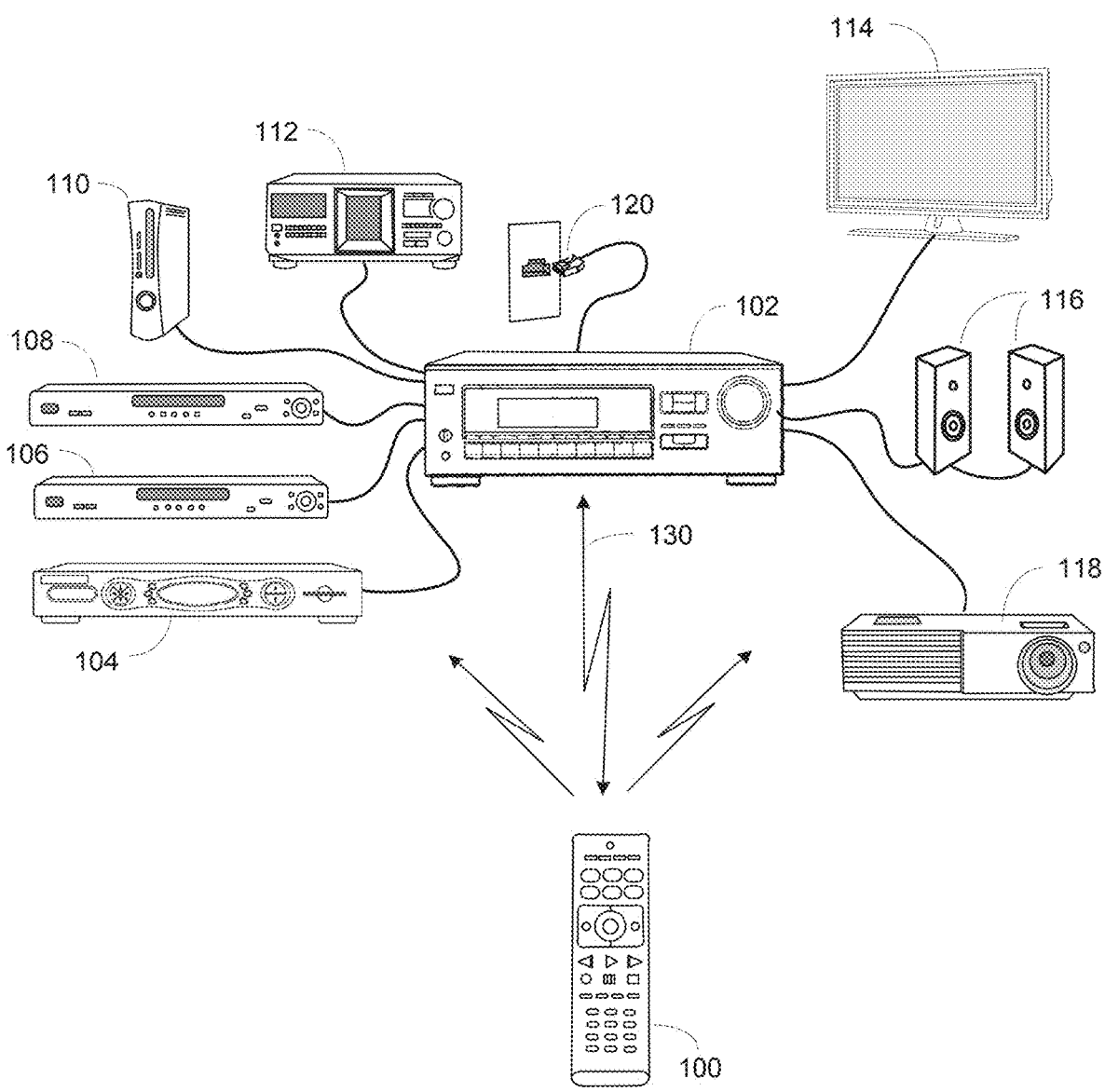
FIG. 1 illustrates an exemplary system in which the methods of the subject disclosure may be practiced.

Turning now to FIG. 1, there is illustrated an exemplary home entertainment system in which the audio/video outputs of a group of various media source appliances such as for example a set top box ("STB") 104, a first DVD player 106, a second DVD player 108, a game console 110, and a CD changer 112 are all connected as inputs to an AV receiver 102. AV receiver 102 in turn functions to switch the currently desired input media stream to one or more designated outputs of AV receiver 102 which are, in turn, connected to various audio and/or video rendering devices such as TV 114, projector 118, and/or loudspeakers 116; all as is well known in the art. In some embodiments AV receiver 102 may also include a network interface 120, for example Ethernet, for the routing of streaming media input/output from or to other areas of the home. When included, such a network interface may also be available for Internet access, download of firmware updates and/or other data into AV receiver 102, etc., again as well known in the art. Also illustrated is a universal controlling device 100 which is capable of transmitting commands to the appliances, using any convenient IR, RF, Point-to-Point, or networked protocol, to cause the appliances to perform operational functions. While illustrated in the context of a home entertainment system, it is to be understood that appliances controllable by universal controlling device 100 may include, but need not be limited to, televisions, VCRs, DVRs, DVD players, cable or satellite converter set-top boxes ("STBs"), amplifiers, AV receivers, CD players, game consoles, home lighting, drapery, fans, HVAC systems, thermostats, personal computers, etc. In a preferred embodiment, controlling device 100 supports bidirectional communication 130 with AV receiver 102 via any convenient IR or RF protocol.

Figure 2:
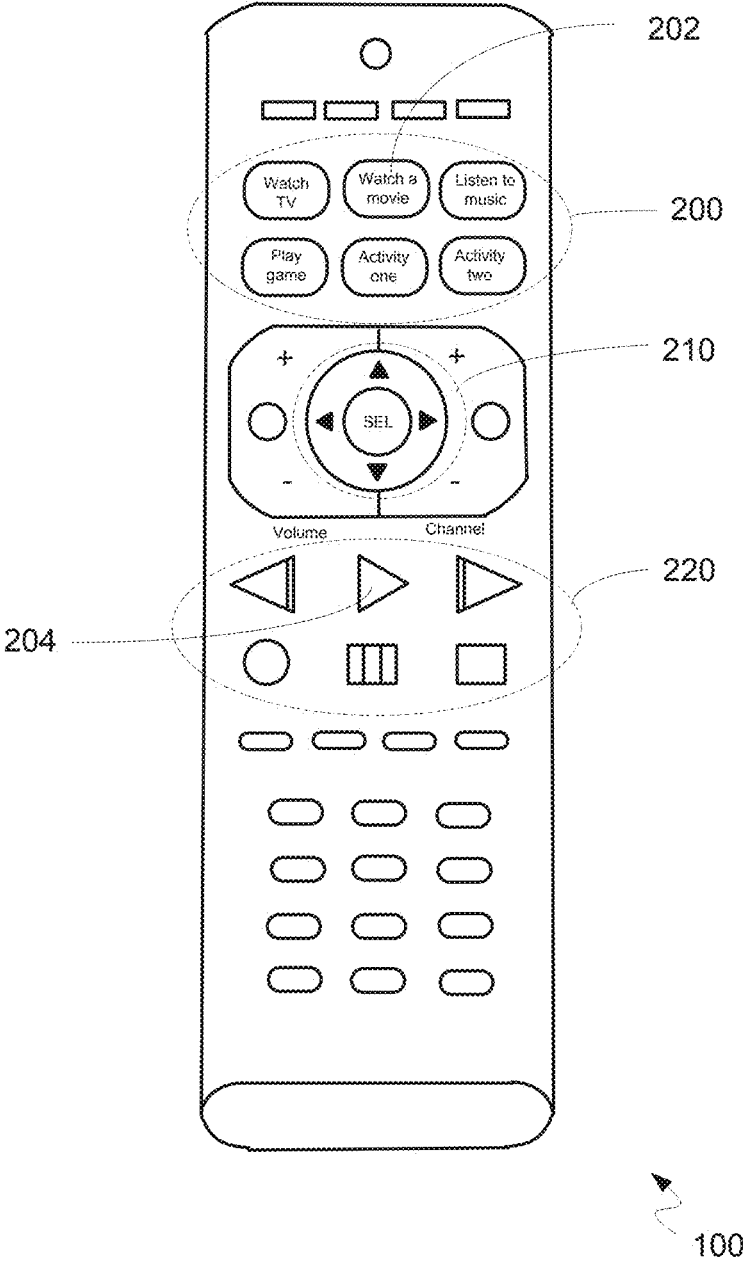
FIG. 2 further illustrates an exemplary controlling device of the system of FIG. 1.

In an exemplary embodiment, controlling device 100 may be further adapted to function in cooperation with AV receiver 102 to configure the illustrative entertainment system in accordance with a user's desired activities. To this end, as illustrated in FIG. 2, an exemplary controlling device may be provisioned with a series of activity selection keys or buttons 200 with designations such as, for example, "Watch TV", "Watch a Movie", "Listen to Music", "Play a Game", etc. Activation of such an activity selection key may cause AV receiver 102 and/or controlling device 100 to cooperatively place the exemplary home entertainment system into a user-specified state which has been associated with that activity, as will be described in further detail hereafter.

Figure 3:
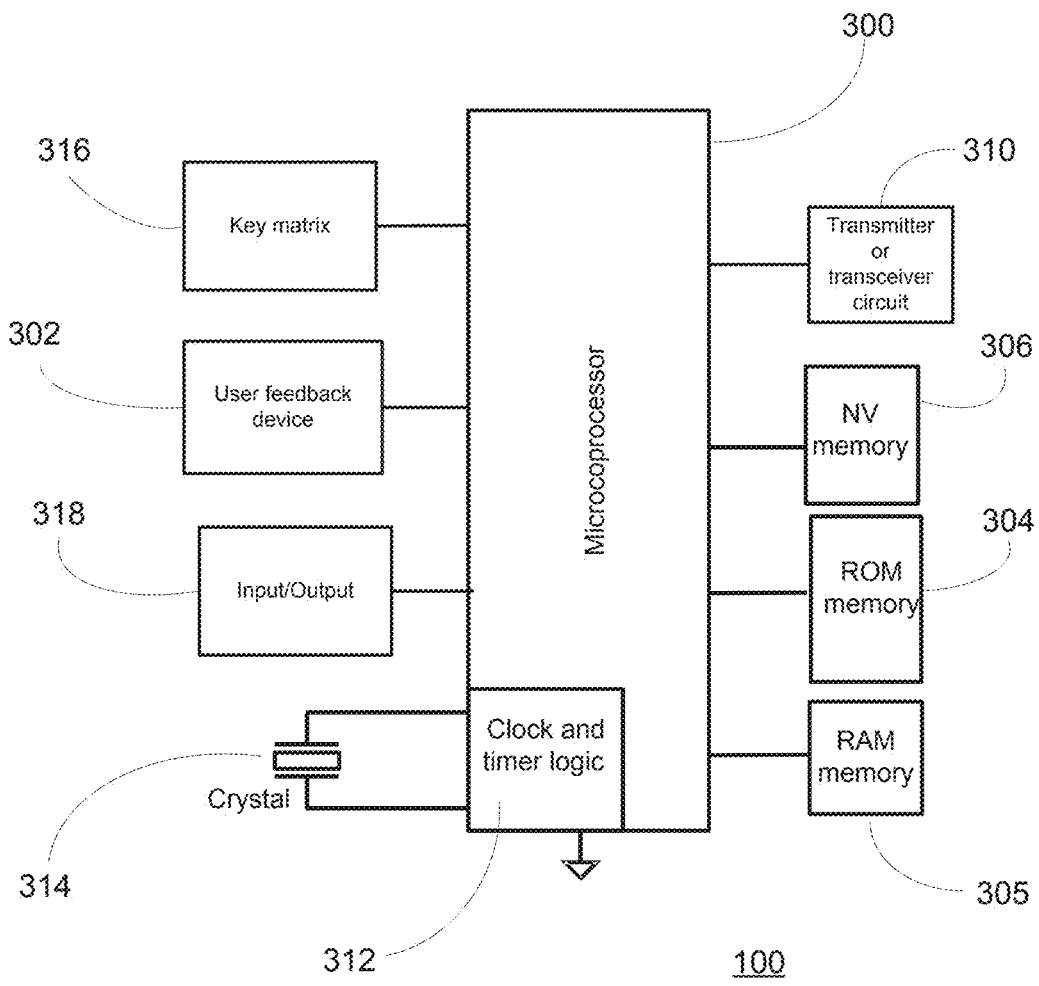
FIG. 3 illustrates a block diagram of exemplary components of the exemplary controlling device of FIG. 2.

Turning now to FIG. 3, for use in commanding the functional operations of one or more appliances, the controlling device 100 may include, as needed for a particular application, a processor 300 coupled to a ROM memory 304, a RAM memory 305, a key matrix 316 (e.g., hard keys, soft keys such as a touch sensitive surface overlaid on a liquid crystal (LCD), and/or an electroluminescent (EL) display), transmission circuit(s) and/or transceiver circuit(s) 310 (e.g., IR and/or RF), a non-volatile read/write memory 306, a means 302 to provide feedback to the user (e.g., one or more LEDs, display, speaker, and/or the like), an input/output port 318 such as a serial interface, USB port, modem, Zigbee, WiFi, or Bluetooth transceiver, etc., and clock and timer logic 312 with associated crystal or resonator 314.

As will be understood by those skilled in the art, some or all of the memories 304, 305, 306 may include executable instructions (collectively, the controlling device program memory) that are intended to be executed by the processor 300 to control the operation of the remote control 100, as well as data which serves to define to the operational software the necessary control protocols and command values for use in transmitting command signals to controllable appliances (collectively, the command data). In this manner, the processor 300 may be programmed to control the various electronic components within the remote control 100, e.g., to monitor the key matrix 316, to cause the transmission of signals, etc. The non-volatile read/write memory 306, for example an EEPROM, battery-backed up RAM, FLASH, Smart Card, memory stick, or the like, may additionally be provided to store setup data and parameters as necessary. While the memory 304 is illustrated and described as a ROM memory, memory 304 can also be comprised of any type of readable media, such as ROM, FLASH, EEPROM, or the like. Preferably, the memories 304 and 305 are non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 304 and 306 respectively), and/or may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 is adapted to be responsive to events, such as a sensed user interaction with the key matrix 316, etc. In response to an event, appropriate instructions within the program memory (hereafter the "controlling device operating program") may be executed. For example, when a function key is actuated on the controlling device 100, the controlling device 100 may retrieve from the command data stored in memory 304, 305, 306 a command value and control protocol corresponding to the actuated function key and, where necessary, current device mode and transmit that command to an intended target appliance, e.g., STB 104, in a format recognizable by that appliance to thereby control one or more functional operations of that appliance. It will be appreciated that the operating program can be used not only to cause the transmission of commands and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

For selecting sets of command data to be associated with the appliances to be controlled data may be provided to controlling device 100 that serves to identify each intended target appliance by its make, and/or model, and/or type. Such data allows the controlling device 100 to identify the appropriate command data set within a library of command data that is to be used to transmit recognizable commands in formats appropriate for such identified appliances. Such a library of command data may be preprogrammed in controlling device 100, downloaded into controlling device 100 as part of the setup process, or a combination thereof. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In certain embodiments, such data used to identify an appropriate command data set may take the form of a numeric setup code (obtained, for example, from a printed list of manufacturer names and/or models with corresponding code numbers, from a support Web site, etc.) which may be entered via activation of those keys that are also used to cause the transmission of commands to an appliance, preferably the keys that are labeled with numerals.

Alternative device setup procedures known in the art include scanning bar codes, RFID tags, or other indicia; sequentially transmitting a predetermined command in different formats until a target appliance response is detected; interaction with a Web site culminating in downloading of command data and/or setup codes to the controlling device, etc. Further, in embodiments such as that illustrated in FIG. 1, set up of a controlling device 100 may be performed interactively in conjunction with AV receiver 102, using a connected device such as TV 114 for GUI display and a database of codes and/or brand and model information stored locally on AV receiver 102 or located remotely on a PC or Web server and accessed via network connection 120. Since such methods for setting up a controlling device to command the operation of specific home appliances are well-known, these will not be described in greater detail herein. Nevertheless, for additional information pertaining to setup procedures, the reader may turn, for example, to U.S. Pat. No. 4,959,810, 5,614,906, or 6,225,938 or to pending U.S. patent application Ser. No. 11/915,562, all of like assignee and all incorporated herein by reference in their entirety.

Figure 4:
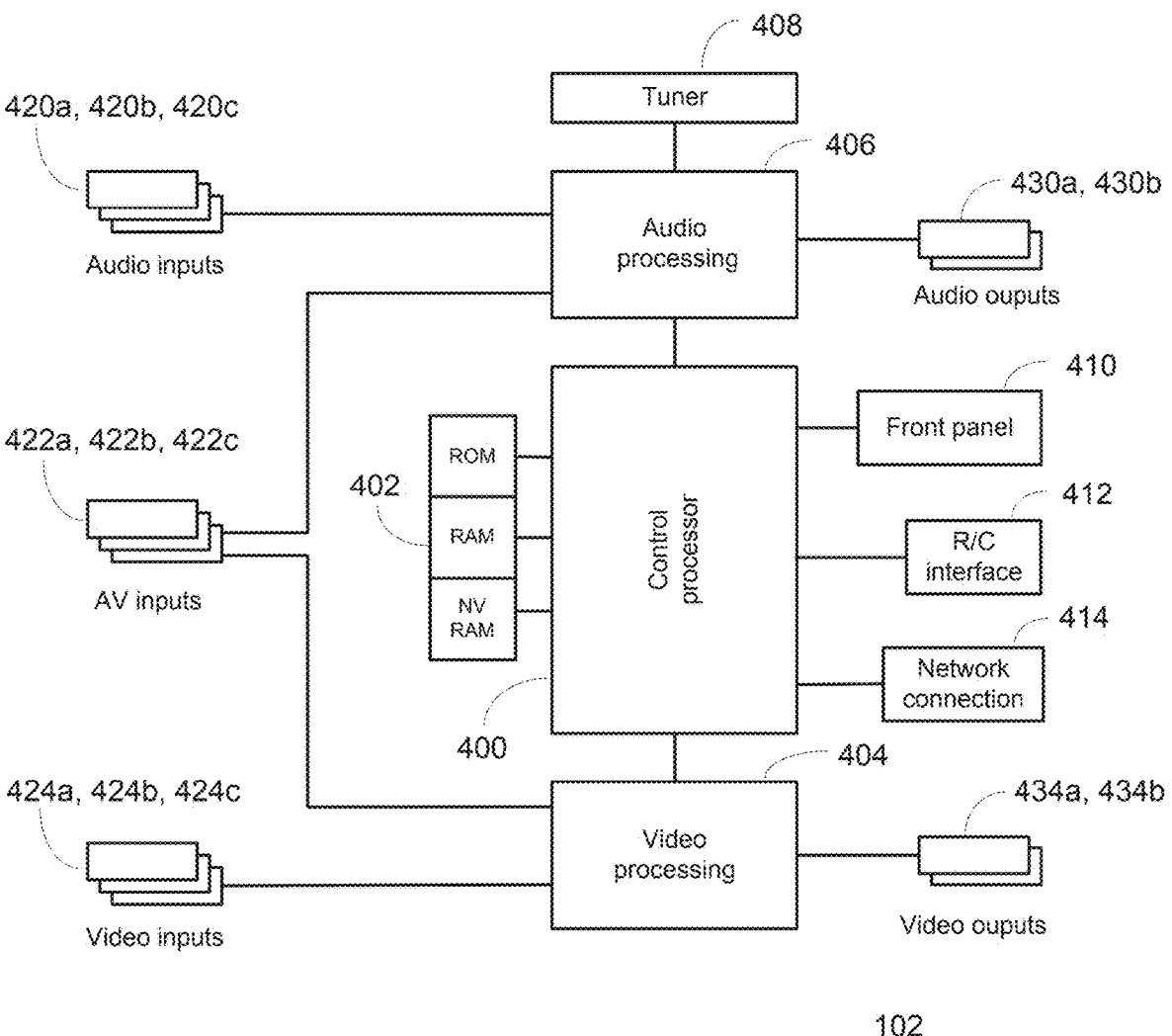
FIG. 4 illustrates a block diagram of exemplary components of an AV receiver of the system of FIG. 1.

With reference to FIG. 4, an exemplary AV receiver 102 may include, as needed for a particular application, a control processor 400 coupled to a memory 402 which may comprise any combination of ROM, RAM, and/or non-volatile read write memory; video and audio processing sections 404, 406; a tuner 408 for reception of radio broadcast channels; a front panel 410 including user controls and/or a display; a remote control interface 412 for communicating with a controlling device (e.g. 100); a network interface 414 for communication with a local and/or wide area network; audio inputs 420a through 420c; video inputs 424a through 424c; AV inputs 422a through 422c; audio outputs 430a, 430b; and video outputs 434a and 434b. As will be appreciated, audio and video inputs and outputs (which may be more or less in number than illustrated) may comprise analog or digital signals and exemplary AV receiver 102 may be provisioned with analog-to-digital (ADC) converters, digital-to-analog (DAC) converters, video decoders, HDMI encoder/decoders, CODECs, format converters, etc., all as necessary to implement the input/output switching and routing functionality. It will be further appreciated that the functionality of video and audio processing blocks 404 and 408 may be implemented in separate components such as a specialized digital signal processors (DSP), may be implemented as part of control processor 400, or any combination thereof, and that portions of memory 402 may be allocated to or associated with audio and video processing blocks 404,408.

It will also be appreciated that some or all of the memory elements 402 may take the form of a chip, a hard disk, a magnetic disk, an optical disk, FLASH memory, and/or the like, and that all or portion of the memory 402 may be physically incorporated within the same IC chip as the control processor 400 and/or audio or video processing blocks 404,406 and, as such, memory 402 is shown separately in FIG. 4 only for the sake of clarity.

As will be understood by those skilled in the art, some or all of the memory 402 may include executable instructions that are intended to be executed by the processor 400 to control the operation of the AV receiver 102 (hereafter, the "AV receiver operating program"). In this manner, the processor 400 may be programmed to control the various electronic components within the AV receiver, e.g., to monitor the front panel 410 and or remote control interface 412, to cause the routing of video and/or audio signals between the various inputs and outputs, to control selection of radio broadcast channel by tuner 408, to control volume and equalization settings of audio outputs 430a and 430b, etc. Further, the AV receiver operating program, in conjunction with video processing block 404, may provide GUI-based setup menus for AV receiver functions such as input and output assignments, levels, balances, equalization, etc., via a connected video monitor device such as for example TV 114. Since such GUI-based AV receiver setup is well known in the art, for the sake of brevity it will not be described further herein, however if greater detail is desired regarding such features and functionality the interested reader may reference, for example, a document such as the Denon AV Surround Receiver STR-DA5500ES Owner's Manual (D&M Holdings Inc. publication number 5411 10255 000D).

In addition, in an exemplary embodiment described herein the AV receiver operating program may include programming which functions in cooperation with controlling device 100 to define and subsequently execute user-desired configuration of the home entertainment system in accordance with various activities.

With reference to FIG. 5, after completing the initial set up of AV receiver 102, for example as described in the above referenced Denon STR-DA5500ES User's Manual, a user may wish to configure the functionality of the activity buttons 200 of controlling device 100. To this end, she may place the AV receiver into an activity setup mode via, for example by a sequence of keypresses on controlling device 100, use of navigation keys 210 of controlling device 100 to select a menu item displayed on TV 114, or such other action as may be appropriate for a particular embodiment. Upon entering activity setup mode, the AV receiver operating program may display an exemplary initial status message 530 on TV 114 prompting the user to select an activity to configure. The AV receiver operating program thereafter waits at step 502 for user input, i.e. activation of one of the activity buttons 200 of controlling device 100. In the illustrated example, the user may select button 202 labeled "Watch a Movie", resulting in communication by the controlling device 100 of an appropriate key command value to AV receiver 102. Upon receipt of the "Watch a Movie" activity command, at step 504 the AV receiver operating program may display a listing 532 of available source devices that are known to be connected to inputs 422, 424 of AV receiver 102. In this context it will be appreciated that the earlier-mentioned initial setup procedures of AV receiver may include user labeling/identification of the devices connected to the various inputs together with a selection of compatible command data sets within universal controlling device 100, and the resulting user friendly labels such as "DVD player", "Projector", etc. may be used thereafter in the generation of displays such as that illustrated at 532. Additionally, the displayed listing may be further tailored by the AV receiver operating program to include only those currently-configured devices known to be compatible with the specified activity—for example, for the presently illustrated "Watch a Movie" activity devices which are incapable of sourcing a video stream, such as CD player 112 or tuner 408 may be omitted from the list presented to the user. At step 506, the user may employ navigation keys 210 of controlling device 100 to move a cursor 536 and select desired source device(s). One or more source devices may be selected, as indicated for example by indicia 534. In the event more than one source device is designated, the user may be prompted at activity execution time to select the desired source, as will be described in further detail hereafter in conjunction with FIG. 6.

Upon completion of source device selection, at step 508 a list 538 of possible destination devices may be displayed for user selection at step 510 in a similar manner to that described above. Once again, the list of devices may be tailored by the AV receiver operating program to include, in this case, only those currently-configured devices known to be capable of rendering the designated input media stream(s). Although not shown, it will be appreciated that other configuration options may also be presented to the user in certain embodiments, for example, selection of a destination for audio output. Once all user selections have been made, at step 512 the activity configuration parameters may be finalized and stored in AV receiver memory 402 for future use in configuring the home entertainment system when the indicated activity is called for, e.g., the final configuration is stored and associated with the received key command value corresponding to the activity key that was activated at the start of the configuration process. Thereafter, the AV receiver operating program may display a completion message 540, including in this example a reminder 542 that final source selection will be required at execution time. At step 516, the user indicates whether she wishes to set up another activity, in which case processing returns to initial step 502. If not, activity setup is complete and the AV receiver operating program exits setup mode and returns to normal operation.

The execution of an exemplary activity configuration request will now be discussed in conjunction with FIG. 6. Upon actuation of an activity button on controlling device 100, for example 202 "Watch a Movie" and receipt of the resulting appropriate key command value communication by AV receiver 102, assuming the AV receiver operating program is in the normal operation state (i.e. not in setup mode as described previously), at step 602 the AV receiver operating program first determines if the activity by the key command value received from the controlling device has in fact been configured. If not, at step 624 an error message is displayed, for example on TV 114, prompting the user to first configure that activity, and the activity request is ignored. If the activity has been configured, at step 604 the AV receiver operating program next determines from the configuration associated with the received key command value if multiple sources were configured. If so, at step 606 the options are displayed as illustrated at 630 and the user is prompted to select a desired source device, for example, by using the navigation and selection keys of the controlling device to highlight and select the desired source device. As will be appreciated, if only one source device was configured at setup time, this step may be skipped. Once a source device has been designated, at step 608 the AV receiver operating program selects the audio, video and/or AV inputs associated with the designated source device. At step 610, the AV receiver operating program determines if the selected source device is powered on, for example by detecting presence or absence of audio/video signal, sensing HDMI status, etc. as appropriate for the device connection in question. Alternatives such as power sensing, etc. may also be available in certain embodiments. If the selected source device is not powered on, in a preferred embodiment at step 612 a request may issued to controlling device 100 via bidirectional communication link 130 to transmit a "power on" command to the source appliance. As will be appreciated, such a request would include data that functions to indicate to the controlling device 100 the intended target appliance for the "power on" command. Thereafter, at step

614 the AV receiver operating program determines if multiple destinations were configured. If so, at step 616 the options are displayed as illustrated at 632 and the user prompted to select a desired destination device as described above. Again, if only one destination device was configured at setup time, this step may be skipped. At step 618, the AV receiver operating program determines if the selected destination device is powered on, for example by sensing HDMI status. Alternatives such as detection of AV signals from an auxiliary output of a rendering device, power sensing, etc. may also be available in certain embodiments. If the selected destination device is not powered on, in a preferred embodiment at step 620 a request may be issued to controlling device 100 via bidirectional communication link 130 to transmit a "power on" command to the destination appliance.

While initiation of a "Watch a Movie" activity via key 202 may result in automatic configuration of keys of the controlling device, e.g., transport keys 240 may be configured to transmit commands in a format compatible with whichever of appliances 104, 106, 108 have been pre-configured as the media source within the remote control when in the "Watch a Movie" activity mode, in the event that multiple possible sources (or destinations) are possible in the "Watch a Movie" activity mode (which does not allow for a pre-configuration of the keys of the controlling device to a particular appliance), at step 622 data indicative of the appliances to be controlled in the currently selected activity mode may be transferred over bidirectional communication link 130 from the AV receiver operating program to controlling device 100 to cause the controlling device to configure itself to match the activity and selected source and destination appliances. It will also be appreciated that keys of the controlling device 100 may, in whole or in part, be matched to an intended target appliance as a result of receipt of the aforementioned requests to power-on a device and, as such, step 622 can be skipped if this data has already been provided to the controlling device by the AV receiver.

Figure 6:
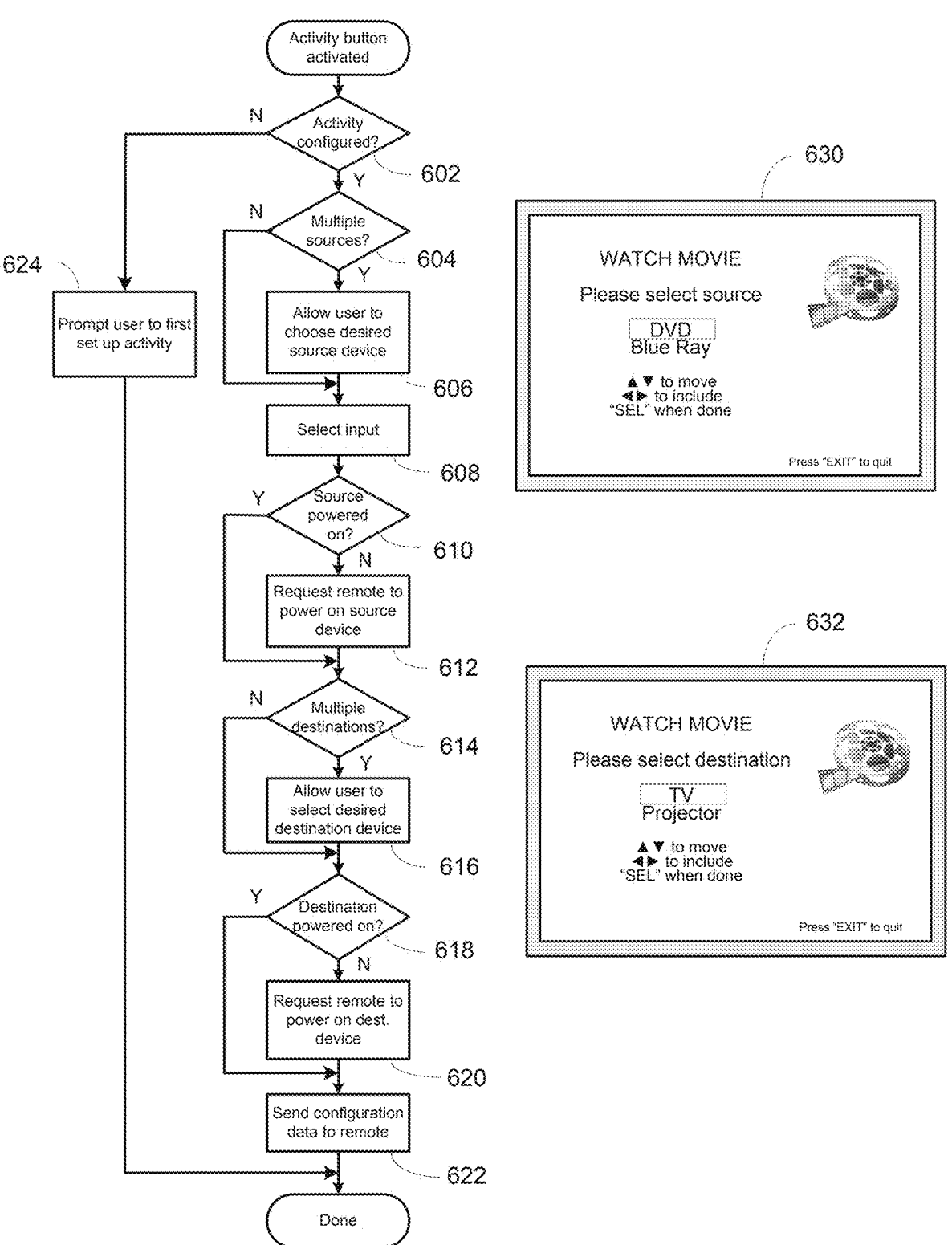
FIG. 6 illustrates an exemplary activity switching process in accordance with the methods of this subject disclosure.

Although not illustrated in the example of FIG. 6, in certain embodiments additional appliance configuration may be initiated by the AV receiver operating program and/or the controlling device operating program and performed by controlling device 100, for example issuance of commands for selection of an appropriate input on TV 114 or projector 118, adjustment of video aspect ratio or picture settings to optimize presentation of the selected source material, etc. Also, additional actions may be initiated by the AV receiver operating program and/or the controlling device operating program with respect to appliances not participating in an activity. For example, initiation of a "Listen to Music" activity may cause the controlling device itself, or result in the issuance of requests to controlling device, to power off video display devices such as TV 114 or projector 118.

In addition to the interactions with AV receiver 102 described above, in certain embodiments the activation of an activity selection button 200 may also invoke a conventional controlling device-based macro command sequence as is known in the art and described, for example, in the previously referenced U.S. Pat. No. 5,959,751. Such macro sequences may be programmed by a user to, for example, adjust lighting levels, control drapes, etc. to create an environment suitable for the commanded activity, as well as to perform additional entertainment appliance configuration functions if desired.

Figure 7:
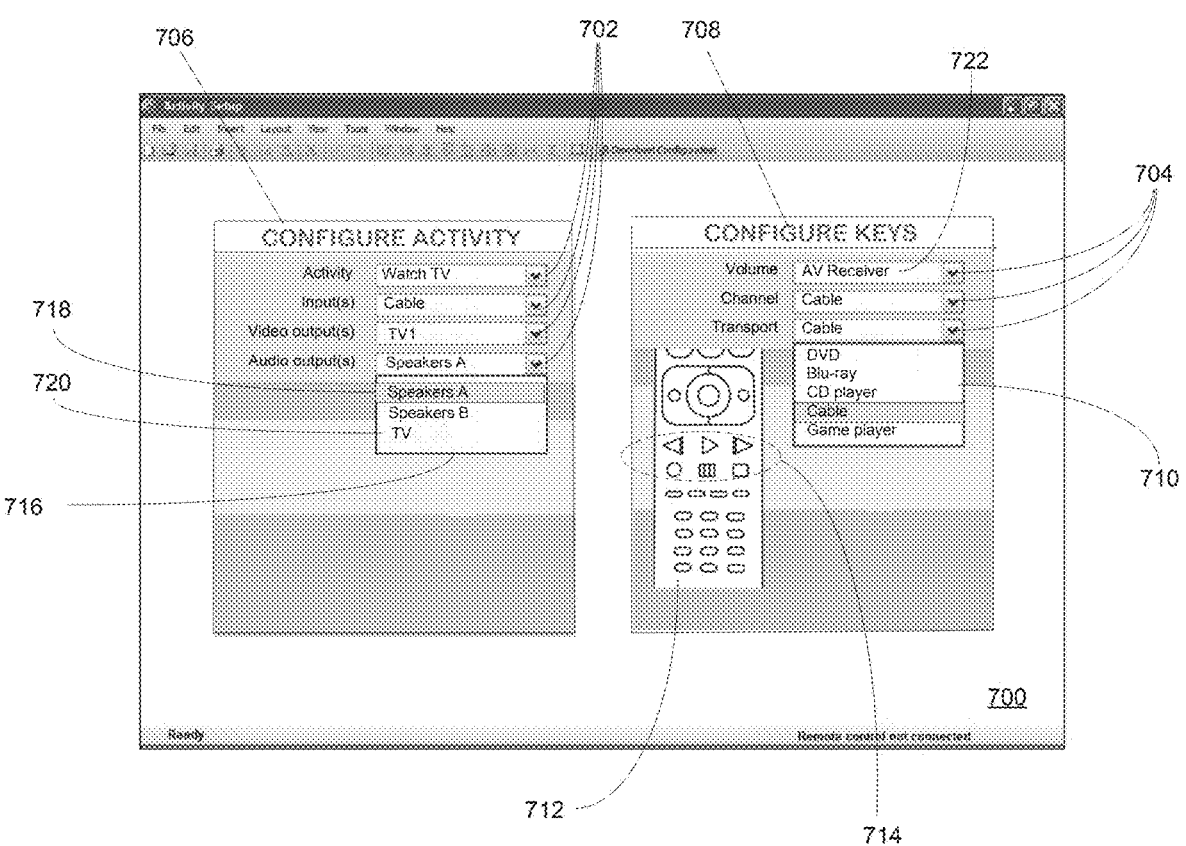
FIG. 7 illustrates a second exemplary activity configuration setup process in accordance with the methods of this subject disclosure.

Turning now to FIG. 7, in an alternative embodiment, a PC based activity setup application may be offered in place of or as an alternative to the AV receiver GUI based setup previously described above in conjunction with FIG. 5. Such a PC based setup option may comprise a locally installed application program, a Web application, or a combination thereof. As illustrated in FIG. 7, the PC based setup application may comprise a GUI 700 which offers a series of drop-down menus 702, 704 from which the various configuration options may be selected. In the illustrative example, separate panels 706 and 708 allow selection and configuration of sources and outputs of an activity and selection and assignment of appliance/controlling device key functionality for that activity, respectively. As will be understood by those of skill in the art, in general two drop-down menus such as 710 and 716 may not be active the same time, they are however illustrated as such in FIG. 7 to assist in a better understanding of the PC application. Drop down menu panel 706 may offer AV receiver related activity configuration choices similar to those previously described in conjunction with FIG. 5, and, to avoid repetition, these will not be repeated. In the illustrated exemplary embodiment, drop down menu panel 708 allows the controlling device key groups for volume control, channel changing and transport to be pre-configured as appropriate. As an aid to the user, in some embodiments an image 712 of controlling device 100 may be displayed with the affected key group highlighted—for example, when the drop down menu 710 for transport keys is active, this group of keys 714 may be highlighted in displayed image 712. In some embodiments, default key assignments may be dynamically established and displayed in panel 708 by the PC application based upon the current activity configuration settings. By way of example, if audio output for an activity is assigned to a set of speakers 718 connected to the output of AV receiver, the default volume key assignment 722 may be the AV receiver, whereas if the audio output for the same activity were to be assigned to the TV device 720, the default volume control key assignment may be the TV device. In this context, it will be appreciated that in certain embodiments provision may be made for uploading existing activity configuration settings from an AV receiver into the PC application for editing by a user, in which instance the existing values may become the default settings. It will be appreciated that in instances where more than one input or output device has been selected for an activity and the final choice is to be made at execution time as previously described, some or all of the drop down menu items in key configuration panel 708 may be omitted or replaced with generic designators such as "Audio destination device" or "Video source", etc.

Once all aspects of the activities match a user's requirements, the user may cause the resulting configuration data to be downloaded into the exemplary AV receiver 102, for example via network interface 120 if both the PC and AV receiver are connected to the same network. Alternatively, configuration data may be uploaded to a remote server for subsequent download to the AV receiver, copied to a memory stick or smart card for physical transfer, etc. Additionally, controlling device 100 may be coupled to the PC and become the repository for some or all of the configuration data, either for later transfer to AV receiver 102, or for direct action by controlling device 100.

Figure 8:
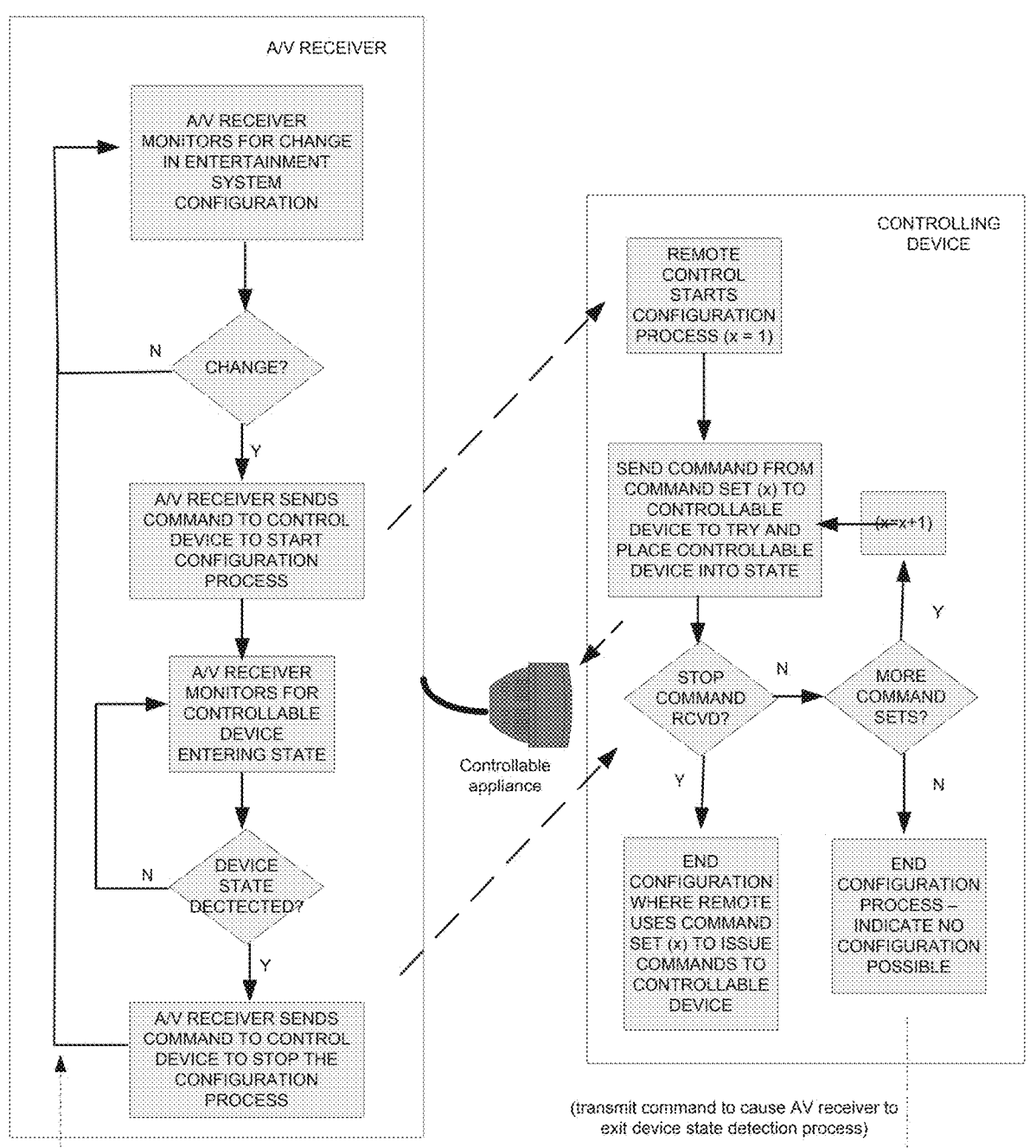
FIG. 8 illustrates an exemplary method for causing a configuring of a controlling device in response to an appliance change being detected by the AV receiver.

In certain embodiments, the operating software of AV receiver 102 may be adapted to detect changes in connected appliances, for example by monitoring disconnection and/or reconnection of interface cabling, by observing changes in source or sink equipment identity or capability data reported over an HDMI or other digital connection, by noting an alteration in the bit rate or format of an input data stream, by detecting connection of an interface cable or presence of a new audio/video signal at a previously unused AV receiver input, or any other appropriate method. The operating software of AV receiver 102 may then respond to a detected change in the appliances connected thereto by transmitting to the controlling device 100 a command communication for the purpose of initiating at the controlling device 100 a setup procedure whereby the controlling device 100 will, with the cooperation with the AV receiver 102, attempt to configure itself to transmit commands to one or more of the connected appliances for the purpose of controlling functional operations of the one or more of the connected appliances. For example, as illustrated in FIG. 8, the controlling device 100 may response to the command communication sent by the AV receiver 102 by initiating a setup procedure in which the controlling device 100 transmits to an intended target appliance one or more commands from various command sets for the purpose of causing the intended target appliance to transition into a state that is detectable by the AV receiver 102. When the AV receiver 102 detects that the intended target appliance responds to a command from a command set as transmitted by the controlling device 100, the AV receiver will transmit to the controlling device 100 a command to cause the controlling device 100 to stop transmitting commands at which time the controlling device 100 will configure itself to use the command set from which the response eliciting command was sent, i.e., the command set having the last command transmitted, when the controlling device 100 is thereafter placed into a mode that is intended to control functional operations of that intended target appliance. In some instances, the command that is transmitted to the controlling device 100 from the AV receiver 102 for the purposes of initiating this auto-configuration process may include data, if available, that functions to inform the controlling device 100 of the type of an appliance (e.g., TV, DVD player, etc.), and/or the make of the appliance (e.g., "Sony" brand, "Samsung" brand, etc.) whereby the controlling device 100 can use such provided information to remove from the command sets to be tested those command sets that are not relevant to the appliance information so provided. It will also be understood that, if the type and/or make information provided by the AV receiver 102 corresponds to only one possible command set, the controlling device 100 may simply configure itself to use that command set when the controlling device 100 is thereafter placed into a mode that is intended to control functional operations of that intended target appliance and thus may skip the testing, auto-configuration process described above. To the extent that the AV receiver might be waiting for the controllable device to be placed into a state as part of the configuration process, the controlling device may use that command set to issue a command to the controllable device to thereby place the controllable device into that state so the AV receiver will no longer be looking for that state and, accordingly, allow the AV receiver to exit the configuration monitoring mode. It will also be understood that the command sets to be tested may be provided to the controlling device 100 from an external source, such as server, a cable box, the AV receiver, or the like, as a part of the configuration process (with the unsuccessfully tested command sets then possibly being removed from controlling device 100 upon completion of the configuration process), may be pre-stored in the controlling device 100 before the configuration process commences, or the like. It will be further understood that only the commands to be tested from the command sets could be provided to the controlling device 100 as a part of the configuration process with the entire command set that includes the command that elicited the desired response being thereafter provided to the controlling device upon completion of the configuration process (with the testing commands then possibly being removed from the controlling device 100 upon completion of the configuration process).

Figure 9:
FIG. 9 illustrates exemplary help information which may be presented to a user when it is detected that an appliance is not responding correctly to command requests.

In a further embodiment, the operating software of controlling device 100 may be adapted to always echo certain commands to AV receiver 104, that is, upon actuation of certain functional keys, controlling device 100 may sequentially transmit first a keypress notification to AV receiver 104 and thereafter the appropriate command data in the format recognizable by the current target appliance. Using the received keypress notification data, the operating software of AV receiver 104 may be adapted to monitor the AV inputs and outputs for the expected result of a user appliance command. If the expected result does not occur, an error message may be displayed to prompt the user to retry the command, check the operating mode of controlling device 100, etc. For example, if the currently selected activity is "Watch a Movie" and the operating software of AV receiver 104 is notified by controlling device 100 that the "Play" key 204 has been actuated, the operating software of AV receiver 104 may inspect the DVD player input to discern if a corresponding change in AV input data has occurred, for example an audio component has become present in a digital data stream where there was none before. Alternatively, the operating software may monitor the reported user activity on controlling device 100 for patterns indicative of a problem. For example, repeated actuation of the "Play" key 204 within a short space of time may indicate that an expected appliance response has not occurred. In either case, a message such as illustrated in FIG. 9 may be presented on a connected display such as TV 114 to assist the user in resolving the problem.

While various concepts have been described in detail, it will be appreciated by those skilled in the art that various modifications and alternatives to those concepts could be developed in light of the overall teachings of the disclosure. For example, while described in the context of an AV receiver acting a central switching point for content streams in a home entertainment system, it will be appreciated that any other suitably equipped device, for example an advanced cable or satellite STB, a personal computer, etc., may be substituted for an AV receiver in the practice of the subject disclosure. Further, while a preferred embodiment described above comprises a controlling device capable of bidirectional communication with an AV receiver or other central switching device, it will be appreciate that many of the steps of the inventive methods may also be practiced in a system comprising a controlling device which is in unidirectional (inward) communication with the central switching device, in which case certain controlling device actions may be initiated autonomously as macro sequences using, for example, discrete appliance commands as are know in the art. Furthermore, in the case of a unidirectional controlling device, it is contemplated that, in lieu of receiving appliance indicating data from the AV receiver, the controlling device may be programmed whereby activation of a particular device mode key, e.g., cable, DVD, game player, etc., is used by the controlling device to configure groups of keys of the controlling device to communicate commands to a one of plural possible sources and/or destination appliances in a give activity mode, for example by activating the desired mode key(s) within a predetermined period of time after activation of the activity mode key when used to place the controlling device and AV receiver into that activity mode. Activation of a device mode key in this manner may also be used to cause the transmission of data to the AV receiver to thereby cause the AV receiver to select one of multiple possible sources and/or destinations in lieu of the menu navigation/selection method that was also previously described.

Still further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the subject disclosure. Rather, the actual implementation of such modules would be well within the routine skill of an engineer, given the disclosure herein of the attributes, functionality, and interrelationship of the various functional modules in the system. Therefore, a person skilled in the art, applying ordinary skill, will be able to practice the subject disclosure set forth in the claims without undue experimentation. It will be additionally appreciated that the particular concepts disclosed are meant to be illustrative only and not limiting as to the scope of the subject disclosure which is to be given the full breadth of the appended claims and any equivalents thereof.

All patents cited within this document are hereby incorporated by reference in their entirety.

What is claimed is:

1. A method performed by a media switch device having a plurality of ports, comprising:

causing a first one of the plurality of ports of the media switch device to be designated in a memory of the media switch device as being coupled to a source device;

causing a second one of the plurality of ports of the media switch device to be designated in the memory of the media switch device as being coupled to a sink device;

while operating in a setup mode of operation, receiving a first signal from a remote control, the first signal having data representative of a first key of the remote control, and causing an association to be stored in the memory of the media switch device between the data representative of the first key, the first one of the plurality of ports, and the second one of the plurality of ports; and while subsequently operating in a normal mode of operation, receiving a second signal from the remote control, the second signal having data representative of the first key of the remote control, and responding to the receipt of the second signal by using the association stored in the memory of the media switch device between the data representative of the first key, the first one of the plurality of ports, and the second one of the plurality of ports to automatically cause the source device to be coupled to the sink device via use of the first one of the plurality of ports and the second one of the plurality of ports of the switching device.

2. The method as recited in claim 1, wherein the media switch device utilizes user input to cause the first one of the plurality of ports of the media switch device to be designated in a memory of the media switch device as being coupled to the source device.

3. The method as recited in claim 1, wherein the media switch device utilizes user input to cause the second one of the plurality of ports of the media switch device to be designated in the memory of the media switch device as being coupled to the sink device.

4. The method as recited in claim 1, wherein the media switch device automatically causes the first one of the plurality of ports of the media switch device to be designated in the memory of the media switch device as being coupled to the source device.

5. The method as recited in claim 1, wherein the media switch device automatically causes the second one of the plurality of ports of the media switch device to be designated in the memory of the media switch device as being coupled to the sink device.

6. The method as recited in claim 1, wherein the media switch device utilizes user input to cause the first one of the plurality of ports of the media switch device to be associated in the memory of the media switch device with the data representative of the first key.

7. The method as recited in claim 1, wherein the media switch device utilizes user input to cause the second one of the plurality of ports of the media switch device to be associated in the memory of the media switch device with the data representative of the first key.

8. The method as recited in claim 1, wherein the media switch device automatically causes the first one of the plurality of ports of the media switch device to be associated in the memory of the media switch device with the data representative of the first key.

9. The method as recited in claim 1, wherein the media switch device automatically causes the second one of the plurality of ports of the media switch device to be associated in the memory of the media switch device with the data representative of the first key.

10. A non-transitory, computer readable media having instructions stored thereon, the instructions, when executed by a media switch device having a plurality of ports, causing the media switch device to perform steps comprising:

causing a first one of the plurality of ports of the media switch device to be designated in a memory of the media switch device as being coupled to a source device;

causing a second one of the plurality of ports of the media switch device to be designated in the memory of the media switch device as being coupled to a sink device;

while operating in a setup mode of operation, receiving a first signal from a remote control, the first signal having data representative of a first key of the remote control, and causing an association to be stored in the memory of the media switch device between the data representative of the first key, the first one of the plurality of ports, and the second one of the plurality of ports; and while subsequently operating in a normal mode of operation, receiving a second signal from the remote control, the second signal having data representative of the first key of the remote control, and responding to the receipt of the second signal by using the association stored in the memory of the media switch device between the data representative of the first key, the first one of the plurality of ports, and the second one of the plurality of ports to automatically cause the source device to be coupled to the sink device via use of the first one of the plurality of ports and the second one of the plurality of ports of the switching device.

11. The non-transitory, computer readable media as recited in claim 10, wherein the instructions cause the media switch device to utilize user input to cause the first one of the plurality of ports of the media switch device to be designated in a memory of the media switch device as being coupled to the source device.

12. The non-transitory, computer readable media as recited in claim 10, wherein the instructions cause the media switch device to utilize user input to cause the second one of the plurality of ports of the media switch device to be designated in the memory of the media switch device as being coupled to the sink device.

13. The non-transitory, computer readable media as recited in claim 10, wherein the instructions cause the media switch device to automatically cause the first one of the plurality of ports of the media switch device to be designated in the memory of the media switch device as being coupled to the source device.

14. The non-transitory, computer readable media as recited in claim 10, wherein the instructions cause the media switch device to automatically cause the second one of the plurality of ports of the media switch device to be designated in the memory of the media switch device as being coupled to the sink device.

15. The non-transitory, computer readable media as recited in claim 10, wherein the instructions cause the media switch device to utilize user input to cause the first one of the plurality of ports of the media switch device to be associated in the memory of the media switch device with the data representative of the first key.

16. The non-transitory, computer readable media as recited in claim 10, wherein the instructions cause the media switch device to utilize user input to cause the second one of the plurality of ports of the media switch device to be associated in the memory of the media switch device with the data representative of the first key.

17. The non-transitory, computer readable media as recited in claim 10, wherein the instructions cause the media switch device to automatically cause the first one of the plurality of ports of the media switch device to be associated in the memory of the media switch device with the data representative of the first key.

18. The non-transitory, computer readable media as recited in claim 10, wherein the instructions cause the media switch device to automatically cause the second one of the plurality of ports of the media switch device to be associated in the memory of the media switch device with the data representative of the first key.

* * * * *